US010682865B2

(12) United States Patent
Nakano

(10) Patent No.: US 10,682,865 B2
(45) Date of Patent: Jun. 16, 2020

(54) OPTICAL SCANNING DEVICE AND IMAGE FORMING APPARATUS

(71) Applicant: KYOCERA Document Solutions Inc., Osaka (JP)

(72) Inventor: Issei Nakano, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 122 days.

(21) Appl. No.: 16/078,797

(22) PCT Filed: Jan. 24, 2017

(86) PCT No.: PCT/JP2017/002411
§ 371 (c)(1),
(2) Date: Aug. 22, 2018

(87) PCT Pub. No.: WO2017/145612
PCT Pub. Date: Aug. 31, 2017

(65) Prior Publication Data
US 2019/0061372 A1 Feb. 28, 2019

(30) Foreign Application Priority Data
Feb. 25, 2016 (JP) ................. 2016-034753

(51) Int. Cl.
B41J 2/47 (2006.01)
G02B 26/10 (2006.01)
G02B 26/12 (2006.01)
H04N 1/113 (2006.01)

(52) U.S. Cl.
CPC ............ B41J 2/473 (2013.01); G02B 26/10 (2013.01); G02B 26/12 (2013.01); G02B 26/123 (2013.01); G02B 26/127 (2013.01); H04N 1/113 (2013.01); H04N 1/1135 (2013.01)

(58) Field of Classification Search
CPC ...... G02B 26/10; G02B 26/105; G02B 26/12; G02B 26/121; G02B 26/122
USPC ................... 359/196.1, 201.1, 201.2, 207.11
See application file for complete search history.

(56) References Cited

FOREIGN PATENT DOCUMENTS

| JP | 5-50454 | 7/1993 |
|---|---|---|
| JP | 2001-51214 | 2/2001 |
| JP | 2001-264668 | 9/2001 |

OTHER PUBLICATIONS

International Search Report dated Mar. 28, 2017 in corresponding International Application No. PCT/JP2017/002411.

Primary Examiner — Robert E. Tallman
(74) Attorney, Agent, or Firm — Wenderoth, Lind & Ponack, L.L.P.

(57) ABSTRACT

A first receiving recess (44d) and a second receiving recess (44e) are formed on a surface of the housing, on which a pair of image forming lenses (47) are placed, to receive a first temperature sensor (101a) and a second temperature sensor (101b), and are formed in positions, in which thermal deformation characteristics of the housing are approximately identical at one side and the other side of a first straight line K1, while interposing the first straight line K1 therebetween.

4 Claims, 6 Drawing Sheets

Left side ← Right and left direction of optical scanning device → Right side

Left side ← Right and left direction of optical scanning device → Right side

OPTICAL SCANNING DEVICE AND IMAGE FORMING APPARATUS

TECHNICAL FIELD

The present invention relates to an optical scanning device and an image forming apparatus.

BACKGROUND ART

In general, an optical scanning device installed in an image forming apparatus such as a copy machine includes a light source, a rotating polygon mirror that deflects light beam emitted from the light source unit and allows the deflected light beam to be scanned in a main scanning direction, an image forming lens that forms an image of the light beam deflected and scanned by the rotating polygon mirror on a surface to be scanned at a constant velocity, and a housing that receives devices such as the rotating polygon mirror and the image forming lens.

In this type of optical scanning device, the temperature of the image forming lens is changed due to frictional heat and the like at the time of rotation of the rotating polygon mirror, resulting in a change in a refractive index thereof. Therefore, there is a problem that a position in the main scanning direction of the scanning light having passed through the image forming lens is changed and thus image failure (image failure such as a color shift in the case of a color optical scanning device machine) occurs.

In this regard, for example, Patent Literature 1 discloses a technology in which the surface temperature of the image forming lens is detected by a temperature sensor and a writing start timing of image data is corrected on the basis of the detected temperature, so that a positional shift in the main scanning direction of the scanning light is corrected. In an optical scanning device disclosed in Patent Literature 1, the temperature sensor is provided at an upper side of the image forming lens.

As an arrangement configuration of a scanning optical system in the aforementioned optical scanning device, there has been known an opposed scanning type arrangement configuration in addition to a configuration in which the scanning optical system including the image forming lens is disposed only at one side of a polygon mirror as disclosed in Patent Literature 1. In the opposed scanning type arrangement configuration, the scanning optical system is disposed at the other side as well as the one side of the polygon mirror.

CITATION LIST

Patent Literature

Patent Literature 1: Japanese Unexamined Patent Application Publication No. 2001-51214

SUMMARY OF INVENTION

Technical Problem

In the optical scanning device disclosed in the Patent document 1, since a space for installing the temperature sensor should be ensured at the upper side of the image forming lens, there is a problem that a dimension in a height direction of the optical scanning device increases.

In this regard, it is considered to form a recess on a low wall surface of a housing and receive the temperature sensor in the recess. In this way, it is possible to prevent an installation space of other devices received in the housing from being restricted by the temperature sensor and thus to improve space efficiency.

However, when considering formation of the recess on the low wall surface of the housing in the aforementioned opposed scanning type scanning optical system, there are cases where thermal deformation characteristics are different from each other at one side and the other side of the rotating polygon mirror according to the formation position of the recess. Therefore, it is necessary to allow correction control of the writing start timing of the aforementioned image data to be different from each other at the one side and the other side of the rotating polygon mirror. As a consequence, since a configuration of a circuit board for performing the correction control is complicated, there is a problem that an operation time required for the correction increases and the cost of the circuit board increases.

The present invention has been made to solve the aforementioned problems, and an object of the present invention is to prevent correction control of a writing start timing of image data from being different from each other at one side and the other side of a rotating polygon mirror by disposing a temperature sensor with high space efficiency and using an inexpensive configuration.

Solution to Problem

An optical scanning device according to an aspect of the present invention includes a rotating polygon mirror, a housing that receives the rotating polygon mirror, a pair of light sources disposed at both sides of a first straight line passing through an axis of the rotating polygon mirror while interposing the first straight line therebetween when viewed from an axis direction of the aforementioned rotating polygon mirror, a pair of scanning optical systems each including a pair of image forming lenses disposed to face each other while interposing the aforementioned first straight line therebetween, a temperature sensor provided to at least one of the pair of image forming lenses to measure a temperature of the image forming lens, and a correction control unit that corrects a positional shift in a main scanning direction of light beam emitted from each of the light sources on the basis of the temperature detected by the temperature sensor.

A first receiving recess and a second receiving recess are formed on a surface of the aforementioned housing, on which the aforementioned pair of image forming lenses are placed, the aforementioned temperature sensor is received in at least one of the aforementioned first receiving recess and second receiving recess, and the aforementioned first receiving recess and second receiving recess are formed in positions, in which thermal deformation characteristics of the aforementioned housing are approximately identical at one side and the other side of the aforementioned first straight line, while interposing the first straight line therebetween.

An image forming apparatus according to another aspect of the present invention includes the aforementioned optical scanning device.

Advantageous Effects of Invention

According to the present invention, it is possible to prevent correction control of a writing start timing of image data from being different from each other at one side and the other side of a rotating polygon mirror by disposing a temperature sensor with high space efficiency and using an inexpensive configuration.

DESCRIPTION OF EMBODIMENTS

Embodiment 1

Figure 1:
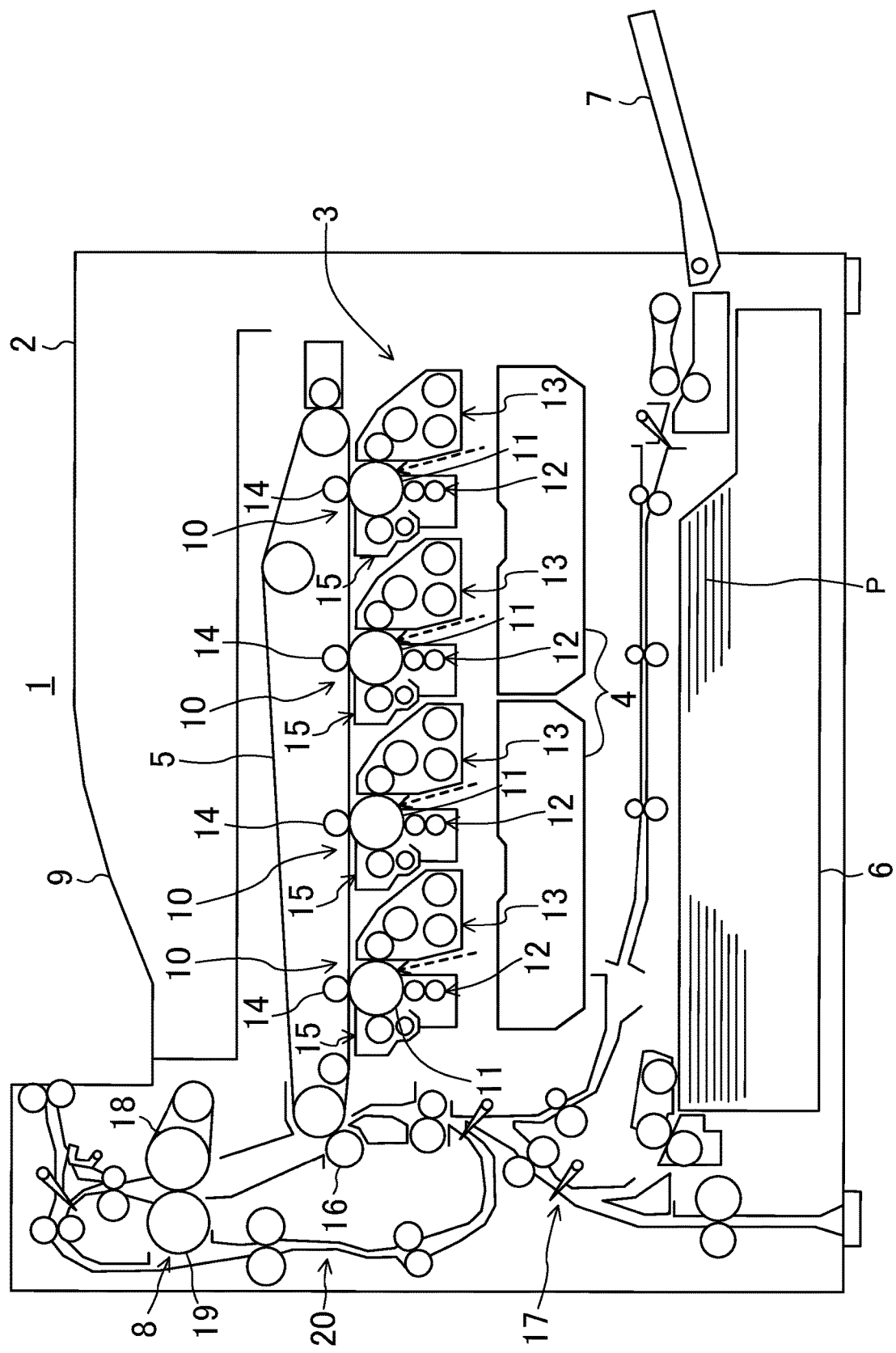
FIG. 1 is a schematic configuration diagram illustrating an image forming apparatus provided with an optical scanning device in an embodiment.

Hereinafter, embodiments will be described on the basis of the drawings. FIG. 1 illustrates a schematic configuration diagram of an image forming apparatus 1 in an embodiment. The image forming apparatus 1 is a tandem type color printer and includes an image forming unit 3 in a box-like casing 2. The image forming unit 3 is a part that transfers an image to a recording sheet P and forms the image on the recording sheet P on the basis of image data transmitted from an external device such as a computer subjected to network connection and the like. Below the image forming unit 3, two optical scanning devices 4 are disposed to irradiate laser beam, and above the image forming unit 3, a transfer belt 5 is disposed. Below the two optical scanning devices 4, a sheet storage unit 6 is disposed to store the recording sheet P, and at the lateral side of the sheet storage unit 6, a manual sheet feeding unit 7 is disposed. At a lateral upper side of the transfer belt 5, a fixing unit 8 is disposed to perform a fixing process on the image transferred to and formed on the recording sheet P. A reference numeral 9 indicates a sheet discharge unit disposed at an upper part of the casing 2 to discharge the recording sheet P subjected to the fixing process in the fixing unit 8.

The image forming unit 3 includes four image forming units 10 disposed in a row along the transfer belt 5. Each of the image forming units 10 has a photosensitive drum 11. Directly under each photosensitive drum 11, a charging device 12 is disposed, and at one side of each photosensitive drum 11, a developing device 13 is disposed. Directly above each photosensitive drum 11, a primary transfer roller 14 is disposed, and at the other side of each photosensitive drum 11, a cleaning unit (hereinafter, referred to as a cleaning device) 15 is disposed to clean the peripheral surface of the photosensitive drum 11.

The peripheral surface of each photosensitive drum 11 is uniformly charged by the charging device 12, and laser beam corresponding to each color based on the image data inputted from the aforementioned computer and the like is irradiated to the charged peripheral surface of the photosensitive drum 11 from the optical scanning device 4, so that an electrostatic latent image is formed on the peripheral surface of each photosensitive drum 11. A developer is supplied to the electrostatic latent image from the developing device 13, so that a toner image of yellow, magenta, cyan, or black is formed on the peripheral surface of each photosensitive drum 11. These toner images are respectively superposed on and transferred to the transfer belt 5 by a transfer bias applied to the primary transfer roller 14.

A reference numeral 16 indicates a secondary transfer roller disposed below the fixing unit 8 in the state of abutting the transfer belt 5, wherein the recording sheet P conveyed along a sheet conveyance path 17 from the sheet storage unit 6 or the manual sheet feeding unit 7 is interposed between the secondary transfer roller 16 and the transfer belt 5, and the toner images on the transfer belt 5 are transferred to the recording sheet P by a transfer bias applied to the secondary transfer roller 16.

The fixing unit 8 includes a heating roller 18 and a pressure roller 19, wherein the recording sheet P is interposed by the heating roller 18 and the pressure roller 19 so as to be heated and pressed, so that the toner images, which have been transferred to the recording sheet P, are fixed to the recording sheet P. The recording sheet P subjected to the fixing process is discharged to the sheet discharge unit 9. A reference numeral 20 indicates a reversing conveyance path for reversing the recording sheet P discharged from the fixing unit 8 at the time of duplex printing.

Next, details of the aforementioned optical scanning device 4 will be described. Two optical scanning devices 4 are provided, wherein one optical scanning device 4 irradiates light to the photosensitive drums 11 for yellow and magenta and the other optical scanning device 4 irradiates light to the photosensitive drums 11 for cyan and black. Since the structures of the two optical scanning devices 4 are identical to each other, the one optical scanning device 4 will be described below.

Figure 2:
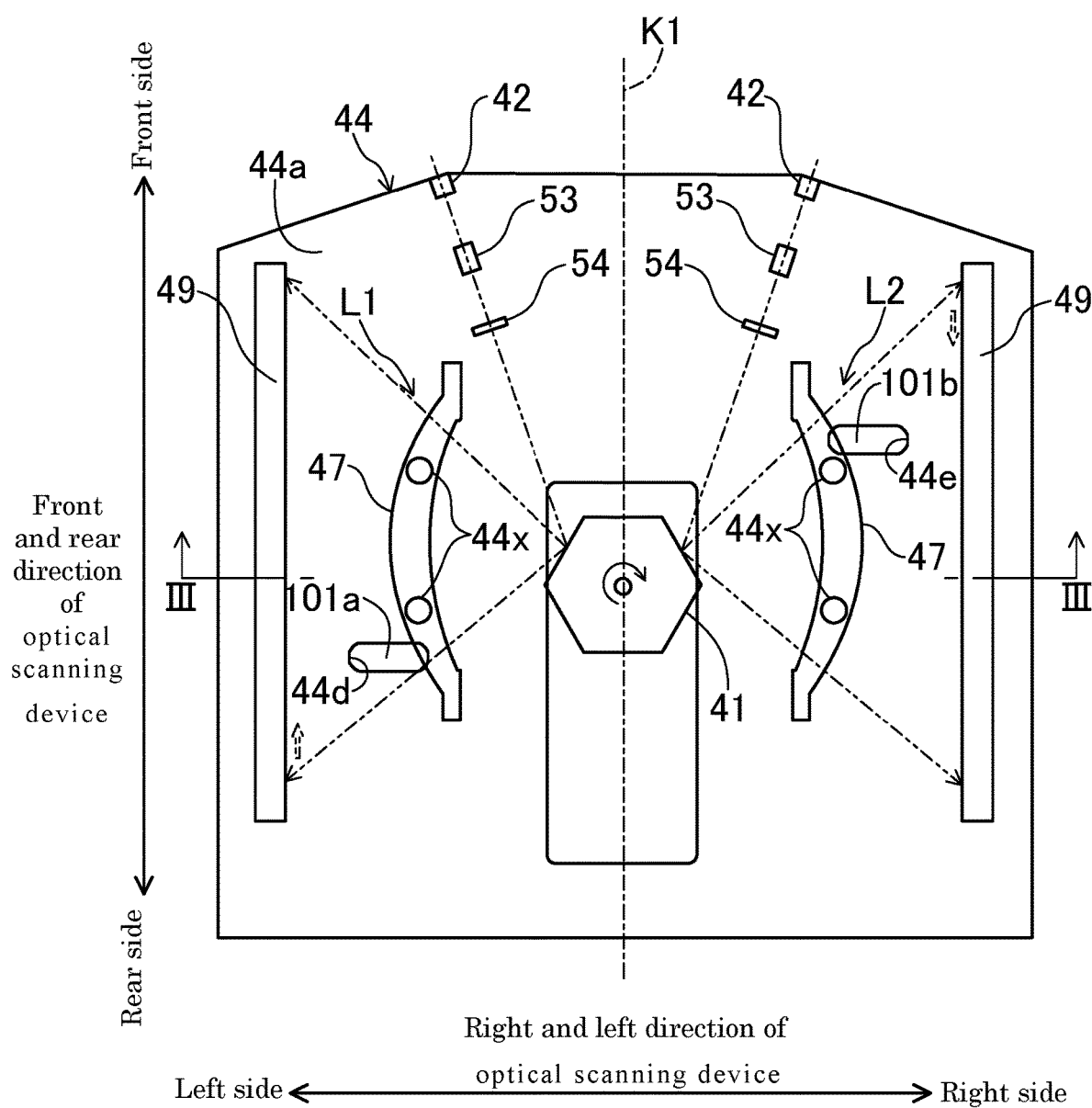
FIG. 2 is a plan view illustrating an optical scanning device in an embodiment.
Figure 3:
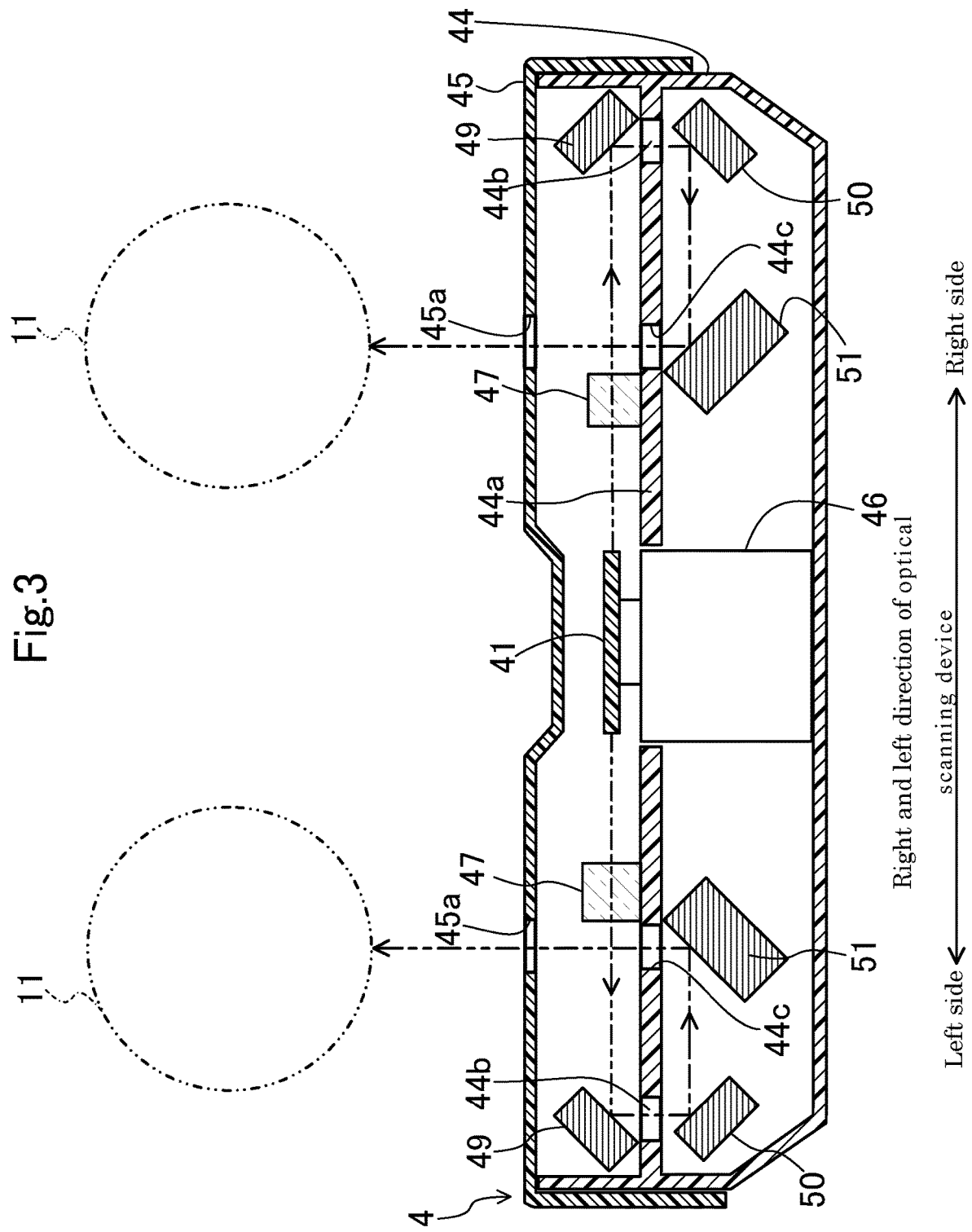
FIG. 3 is a sectional view taken along line III-III of FIG. 2.

FIG. 2 is a plan view illustrating an internal structure of the optical scanning device 4 and FIG. 3 is a sectional view taken along line of FIG. 2. In the following description, a right and left direction of FIG. 2 is defined as a right and left direction of the optical scanning device 4, an up and down direction of FIG. 2 is defined as a front and rear direction of the optical scanning device 4, and a direction vertical to a paper surface of FIG. 2 is defined as an up and down of the optical scanning device 4.

The aforementioned optical scanning device 4 has a housing 44 that receives a polygon mirror 41 therein. The housing 44 is opened upward and an upper side of the housing 44 is closed by a lid member 45. As illustrated in FIG. 3, a device receiving space formed between the housing 44 and the lid member 45 is vertically divided by a partition wall 44a. The partition wall 44a is connected to an intermediate part of a sidewall of the housing 44 in a height direction. At a center part of the partition wall 44a, a polygon motor 46 is disposed by vertically passing through the partition wall 44a, and the aforementioned polygon mirror 41 is fixed to a distal end part of a driving shaft of the polygon motor 46. The aforementioned polygon mirror 41 is formed in a regular hexagonal shape having six reflection surfaces at a side thereof. The polygon mirror 41 reflects light, which is emitted from a pair of light sources 42 (see FIG. 2) rotationally driven by the polygon motor 46 in a clockwise direction of FIG. 2, deflects and scans the light.

The pair of light sources 42 are disposed at both sides of a straight line K1 while interposing the straight line K1 therebetween, wherein the straight line K1 passes through an axis of the polygon mirror 41 from an axis direction of the polygon mirror 41 and extends in the main scanning direction. The pair of light sources 42 are mounted at a front sidewall of the housing 44, and for example, are configured by a laser diode. Between each of light sources 42 and the polygon mirror 41, a collimator lens 53, an aperture (not illustrated) that allows light having passed through the collimator lens 53 to have a predetermined optical path width, and a cylindrical lens 54 which is passed through by the light having passed through the aperture.

In the aforementioned housing 44, scanning optical systems L (see FIG. 2) are respectively disposed at both right and left sides of the aforementioned straight line K1. Each scanning optical system L leads the light reflected by the polygon mirror 41 to the photosensitive drum 11. Specifically, each scanning optical system L has a fθ lens 47 and first to third reflection mirrors 49 to 51. The fθ lens 47 and the first to third reflection mirrors 49 to 51 are disposed so as to extend in the main scanning direction. The fθ lens 47 is adhered and fixed to an upper surface of a pair of protruding boss parts 44x formed on an upper surface of the partition wall 44a. The pair of protruding boss parts 44x are disposed spaced apart from each other in the front and rear direction.

As illustrated in FIG. 3, the aforementioned fθ lens 47 and first reflection mirror 49 are sequentially disposed on the upper surface of the partition wall 44a outward from a center side of the right and left direction. The aforementioned second reflection mirror 50 is disposed below the first reflection mirror 49 while interposing the partition wall 44a between the second reflection mirror 50 and the first reflection mirror 49. The partition wall 44a is formed with a rectangular opening 44b which is passed through by light directed to the second reflection mirror 50 from the first reflection mirror 49. The third reflection mirror 51 is disposed at the center side of the right and left direction from the second reflection mirror 50. The partition wall 44a is formed with a rectangular opening 44c which is passed through by light reflected by the third reflection mirror 51 and directed upward, and the lid member 45 is formed with an opening 45a which is passed through by the light directed upward. The opening 45a is closed by a cover glass.

An operation of the optical scanning device 4 configured as above will be described. Firstly, light emitted from each light source 42 is converted into approximately parallel beam by the collimator lens 53, passes through the aperture (not illustrated) and the cylindrical lens 54, and then is incident on the polygon mirror 41. The incident light is scanned by the polygon mirror 41 at a constant angular velocity, and then is converted into constant velocity scanning by the fθ lens 47. The light having passed through the fθ lens 47 is reflected by the first to third reflection mirrors 49 to 51, is led to the surface of the photosensitive drum 11, and is scanned.

Figure 4:
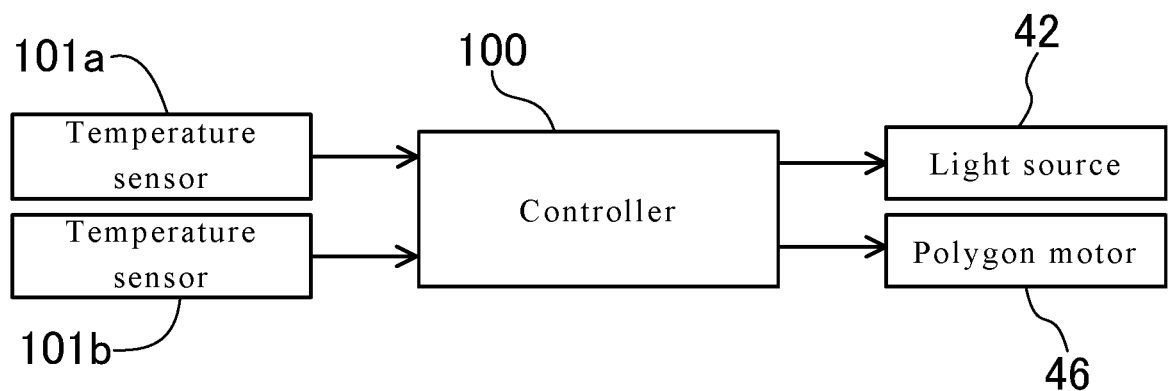
FIG. 4 is a block diagram illustrating a configuration of a control system of an optical scanning device in an embodiment.

The aforementioned pair of light sources 42 is controlled by a controller 100 (see FIG. 4). The controller 100 is electrically connected to a first temperature sensor 101a and a second temperature sensor 101b. The first temperature sensor 101a is a sensor for measuring the temperature of the fθ lens 47 included in the left scanning optical system L, and the second temperature sensor 101b is a sensor for measuring the temperature of the fθ lens 47 included in the right scanning optical system L. The first and second temperature sensors 101a and 101b convert the detected temperatures into electrical signals, and output the electrical signals to the controller 100, respectively.

The controller 100, for example, controls a clock frequency of each light source 42 on the basis of the temperatures detected by the first and second temperature sensors 101a and 101b, thereby correcting a positional shift in the main scanning direction of light beam having passed through each fθ lens 47. The correction control is performed on the basis of correction data stored in a memory of the controller 100.

Figure 5:
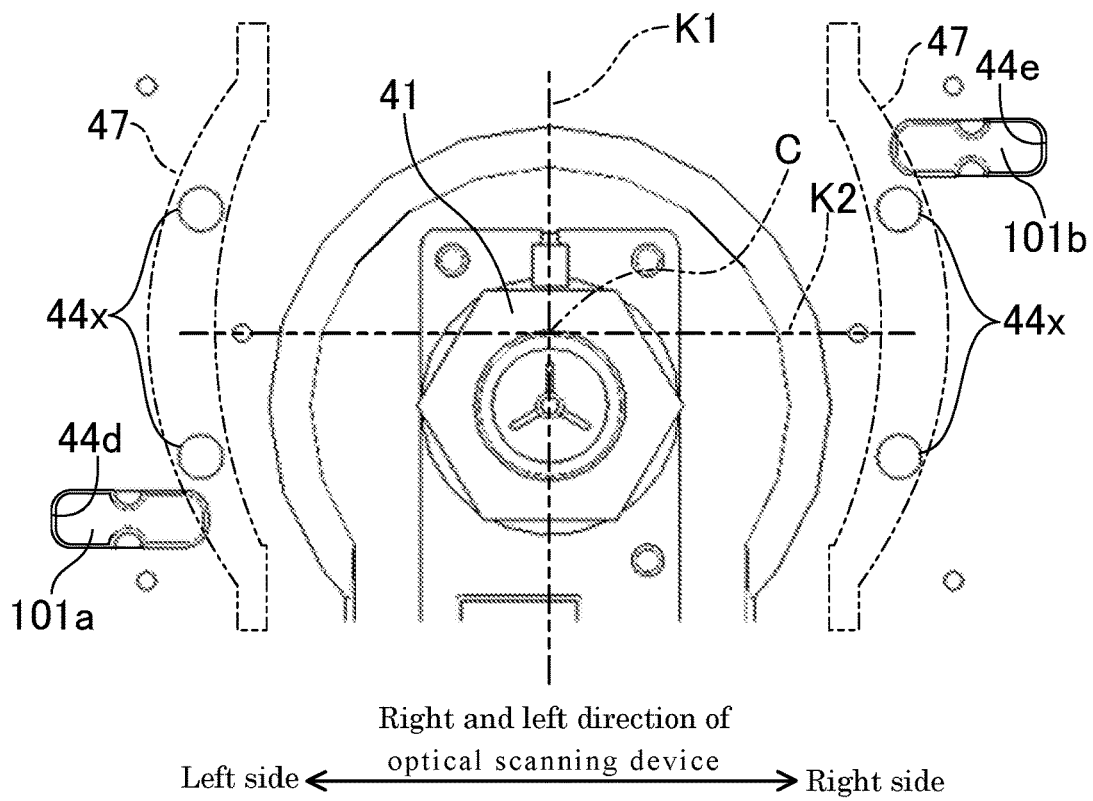
FIG. 5 is a plan view illustrating an example of an arrangement position of receiving recesses of a temperature sensor.

As illustrated in FIG. 5, the first temperature sensor 101a and the second temperature sensor 101b are received in a first receiving recess 44d and a second receiving recess 44e, respectively. The first receiving recess 44d and the second receiving recess 44e are formed on the upper surface (a surface on which the fθ lens 47 is installed) of the partition wall 44a of the housing 44. The receiving recesses 44d and 44e are formed at a lower side of an end part of a light scanning start side in the fθ lens 47.

Each of the receiving recesses 44d and 44e has a rectangular shape extending in the right and left direction in the plan view. A depth of each of the receiving recesses 44d and 44e is identical to or larger than a thickness of each of the temperature sensors 101a and 101b. Consequently, an upper position of each of the temperature sensors 101a and 101b is level with or lower than the upper surface of the partition wall 44a. As described above, the pair of temperature sensors 101a and 101b are completely received in the receiving recesses 44d and 44e, so that space efficiency is improved.

The pair of receiving recesses 44d and 44e are formed in positions in which the thermal deformation characteristics of the housing 44 are approximately identical at the left side and the right side of the aforementioned straight line K1. Specifically, the pair of receiving recesses 44d and 44e are point-symmetrically disposed with respect to an interconnection point C between a straight line K2, which connects centroid positions of the right and left fθ lenses 47 to each other, and the aforementioned straight line K1. The straight line K2 is a straight line passing through between the pair of protruding boss parts 44x, and the protruding boss parts 44x are line-symmetrically disposed with respect to the straight line K2. The pair of protruding boss parts 44x supporting the left fθ lens 47 and the pair of protruding boss parts 44x supporting the right fθ lens 47 are line-symmetrically disposed with respect to the aforementioned straight line K1. The corner par of each of the aforementioned receiving recesses 44d and 44e, which faces the polygon mirror 41 side, is formed so as to be positioned in the vicinity of the protruding boss part 44x.

In the optical scanning device 4 configured as above, the first and second receiving recesses 44d and 44e are point-symmetrically disposed with respect to the interconnection point C between the aforementioned straight line K1 and straight line K2 when viewed from the axis direction of the polygon mirror 41, so that the thermal deformation characteristics of the housing 44 caused by frictional heat and the like during the rotation of the polygon mirror 41 can be approximately identical at both right and left sides of the polygon mirror 41. Consequently, it is possible to correct a positional shift in the main scanning direction of light emitted from each light source 42 without differentiating the aforementioned correction control of the controller 100 in the left scanning optical system L and the right scanning optical system L of the polygon mirror 41. Thus, it is possible to simplify a configuration of a circuit board that performs the correction operation. Accordingly, it is possible to shorten an image formation time by shorting a correction operation time of the controller 100, and to reduce the cost of the circuit board.

Embodiment 2

Figure 6:
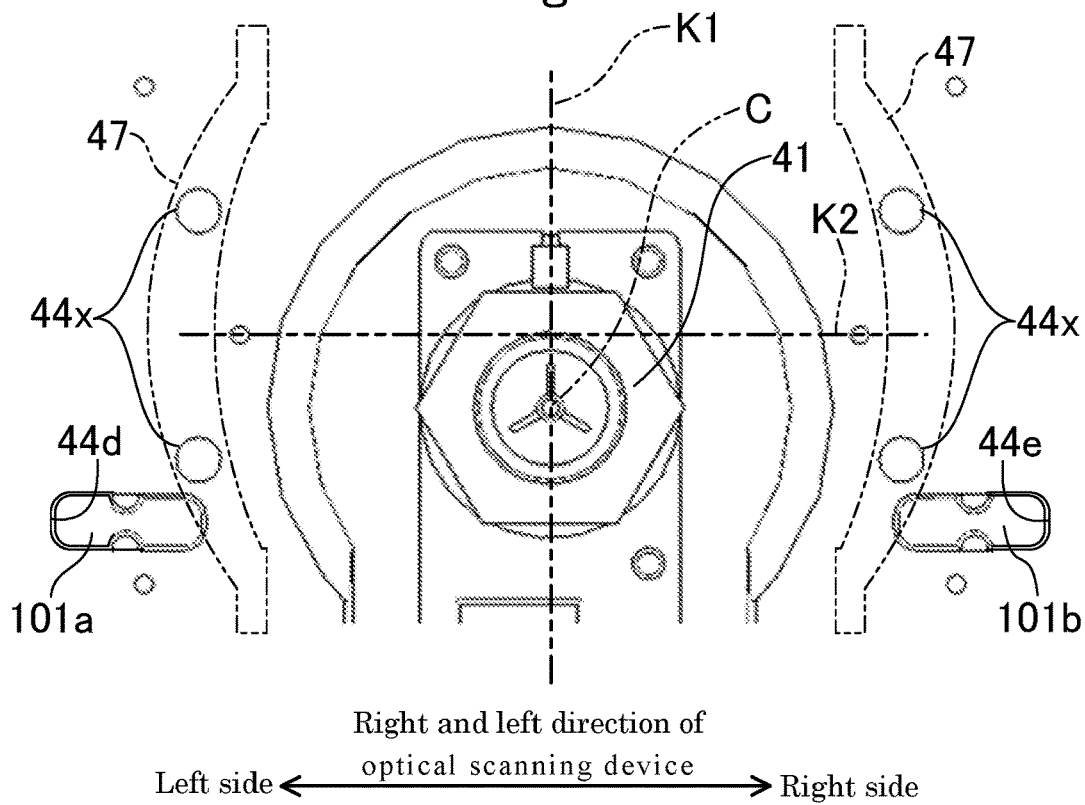
FIG. 6 is a view corresponding to FIG. 5, which illustrates an embodiment 2.

FIG. 6 is a view corresponding to FIG. 5, which illustrates an embodiment 2. In the present embodiment, the first and second receiving recesses 44d and 44e are line-symmetrically disposed with respect to the straight line K1. According to the arrangement configuration, similarly to the aforementioned embodiment 1, the thermal deformation characteristics of the housing 44 caused by frictional heat and the like during the rotation of the polygon mirror 41 can be approximately identical at both right and left sides of the polygon mirror 41. Thus, it is possible to obtain operation and effect similar to those of the embodiment 1.

Embodiment 3

Figure 7:
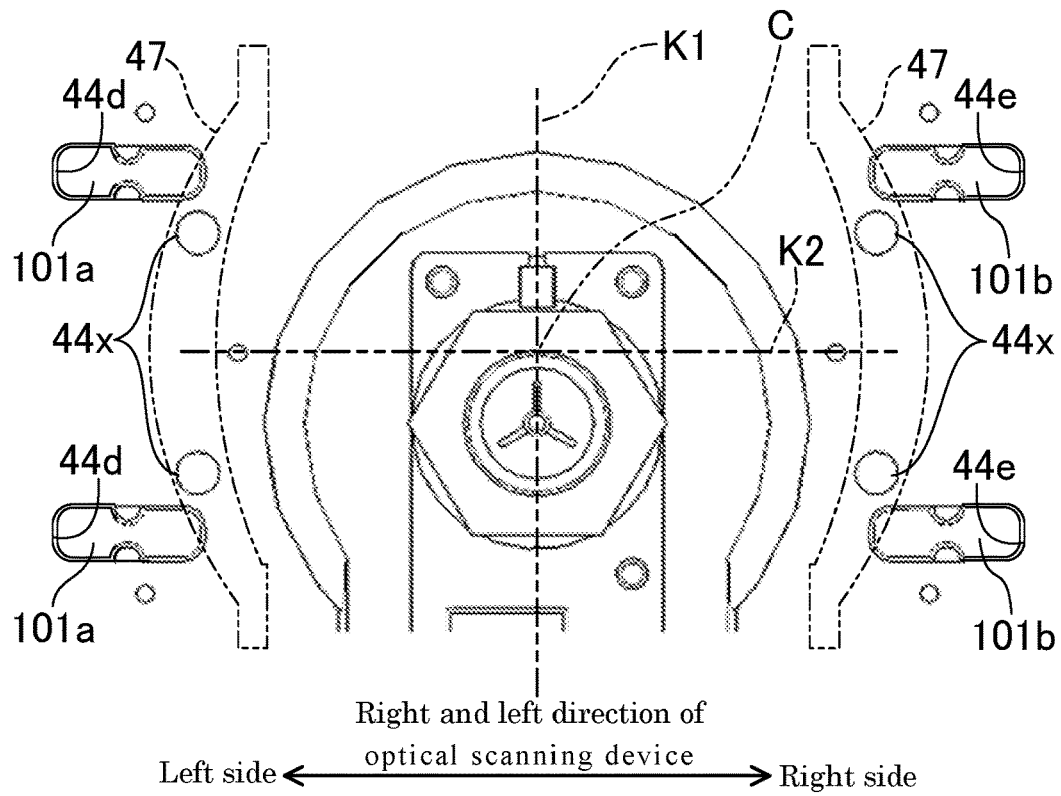
FIG. 7 is a view corresponding to FIG. 5, which illustrates an embodiment 3.

FIG. 7 is a view corresponding to FIG. 5, which illustrates an embodiment 3. In the present embodiment, two first temperature sensors 101a and two second temperature sensors 101b are provided, and thus two first receiving recesses 44d and two second receiving recesses 44e are provided.

The two first receiving recesses 44d are formed at a lower side of both end parts of the left fθ lens 47 in the front and rear direction. The two first receiving recesses 44d are line-symmetrically disposed with respect to the straight line K2. The two first receiving recesses 44d are positioned outside the pair of protruding boss parts 44x in the front and rear direction. The corner pars of the two first receiving recesses 44d, which face the polygon mirror 41 side, are positioned in the vicinity of the protruding boss part 44x.

Similarly, the two second receiving recesses 44e are formed at a lower side of both end parts of the right fθ lens 47 in the front and rear direction. The two second receiving recesses 44e are line-symmetrically disposed with respect to the straight line K2. The two second receiving recesses 44e are positioned outside the pair of protruding boss parts 44x in the front and rear direction. The corner pars of the two second receiving recesses 44e, which face the polygon mirror 41 side, are positioned in the vicinity of the protruding boss part 44x.

The centroid position of a quadrangle, which can connect the centroid positions of each of the two first receiving recesses 44d and the two second receiving recesses 44e to each other, coincides with the interconnection point C between the straight line K1 and the straight line K2.

According to the optical scanning device 4 of the present embodiment 3, it is possible to obtain operation and effect similar to those of the embodiment 1 and the embodiment 2. Furthermore, since the number of the temperature sensors 101a and 101b for measuring the temperature of each fθ lens 47 is large as compared with the aforementioned each embodiment, it is possible to accurately detect the temperature of the fθ lens 47. Accordingly, it is possible to improve the execution accuracy of the aforementioned correction control in the controller 100.

Embodiment 4

Figure 8:
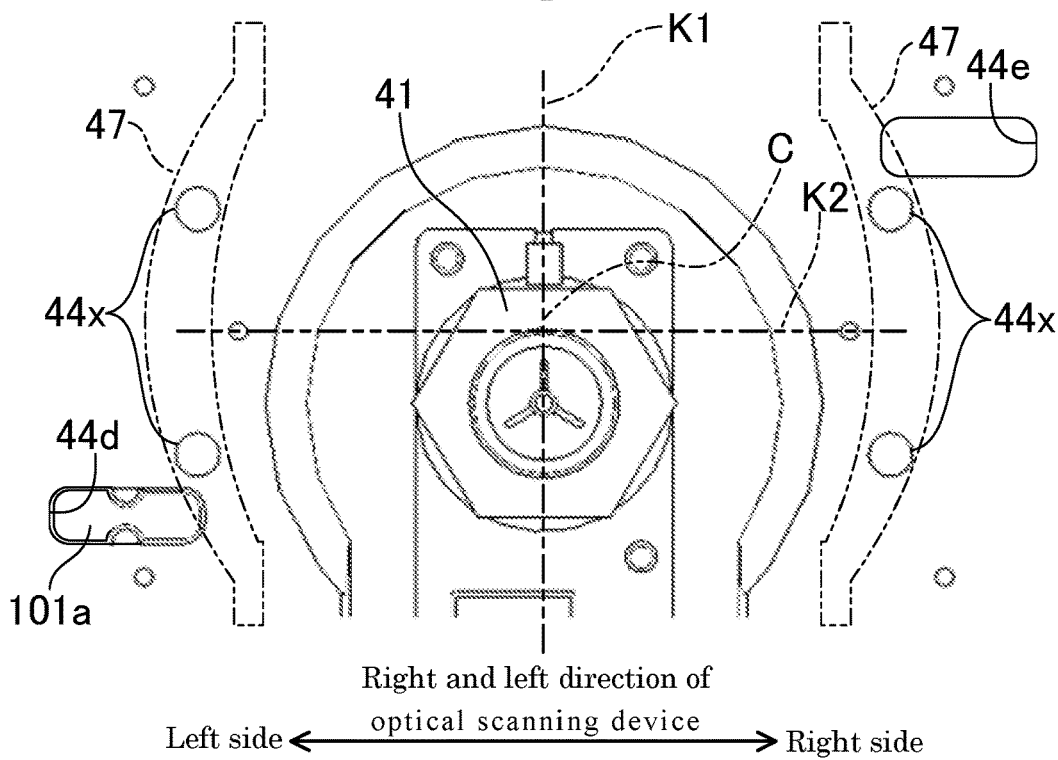
FIG. 8 is a view corresponding to FIG. 5, which illustrates an embodiment 4.

FIG. 8 is a view corresponding to FIG. 5, which illustrates an embodiment 4. The present embodiment is different from the embodiment 1 in that the second temperature sensor 101b is removed and only the first temperature sensor 101a is provided. The first temperature sensor 101a is received in the first receiving recess 44d, but nothing is received in the second receiving recess 44e. The controller 100 controls a clock frequency of each light source 42 on the basis of a temperature detected by the first temperature sensor 101a, thereby correcting a positional shift in the main scanning direction of light beam having passed through each fθ lens 47.

According to the optical scanning device 4 of the present embodiment 4, it is possible to obtain operation and effect similar to those of the aforementioned embodiment 1. Moreover, as compared with the embodiment 2, the number of temperature sensors to be used is small, so that it is possible to reduce the cost of the entire apparatus.

In the present embodiment, the second temperature sensor 101b is removed and only the first temperature sensor 101a is provided; however, the first temperature sensor 101a may be removed and only the second temperature sensor 101b may be provided.

Other Embodiments

In the aforementioned embodiments, an example, in which the optical scanning device 30 is installed in a laser printer, has been described; however, the present invention is not limited thereto and for example, the optical scanning device 30 may be installed in a copy machine, a multifunctional peripheral, a facsimile and the like.

In the aforementioned embodiments 1 to 3, the first temperature sensor 101a for measuring the temperature of the left fθ lens 47 and the second temperature sensor 101b for measuring the temperature of the right fθ lens 47 are provided; however, the present invention is not limited thereto and as described in the aforementioned embodiment 4, any one of the first temperature sensor 101a and the second temperature sensor 101b may be removed.

INDUSTRIAL APPLICABILITY

As described above, the present invention is available for an optical scanning device and an image forming apparatus including the same.

The invention claimed is:

1. An optical scanning device comprising:
   a rotating polygon mirror;
   a housing that receives the rotating polygon mirror;
   a pair of light sources disposed at both sides of a first straight line passing through an axis of the rotating polygon mirror while interposing the first straight line therebetween when viewed from an axis direction of the rotating polygon mirror;
   a pair of scanning optical systems each including a pair of image forming lenses disposed to face each other while interposing the first straight line therebetween;
   a temperature sensor provided to at least one of the pair of image forming lenses to measure a temperature of the image forming lens; and
   a correction control unit that corrects a positional shift in a main scanning direction of light beam emitted from each of the light sources on the basis of the temperature detected by the temperature sensor,
   wherein a first receiving recess and a second receiving recess are formed on a surface of the housing, on which the pair of image forming lenses are placed,
   the temperature sensor is received in at least one of the first receiving recess and the second receiving recess, and
   the first receiving recess and the second receiving recess are formed in positions, in which thermal deformation characteristics of the housing are approximately identical at one side and the other side of the first straight line, while interposing the first straight line therebetween.

2. The optical scanning device of claim 1, wherein the first receiving recess and the second receiving recess are point-symmetrically disposed with respect to an interconnection point between a second straight line, which connects centroid positions of the pair of image forming lenses to each other, and the first straight line when viewed from an axis direction of the rotating polygon mirror.

3. The optical scanning device of claim 1, wherein the first receiving recess and the second receiving recess are line-symmetrically disposed with respect to the first straight line.

4. An image forming apparatus comprising the optical scanning device of claim 1.

* * * * *